United States Patent
Check et al.

(10) Patent No.: US 6,489,595 B1
(45) Date of Patent: Dec. 3, 2002

(54) ELECTRIC HEATER FOR A SEAT ASSEMBLY

(75) Inventors: Robert Check, Clarkston, MI (US); William R. Parnis, Livonia, MI (US); Thomas A. Stuef, Troy, MI (US)

(73) Assignee: Check Corporation, Troy, MI (US)

( * ) Notice: Subject to any disclaimer, the term of this patent is extended or adjusted under 35 U.S.C. 154(b) by 43 days.

(21) Appl. No.: 09/804,423

(22) Filed: Mar. 12, 2001

(51) Int. Cl.7 ................................................. H05B 1/00
(52) U.S. Cl. ........................................ 219/217; 219/202
(58) Field of Search ................................. 219/217, 202, 219/342, 546, 548

(56) References Cited

U.S. PATENT DOCUMENTS

| | | |
|---|---|---|
| 4,044,221 A | 8/1977 | Kuhn |
| 4,697,064 A | 9/1987 | Altmann et al. |
| 4,793,784 A | 12/1988 | Belleville et al. |
| 4,813,738 A | 3/1989 | Ito |
| 4,860,415 A * | 8/1989 | Witzke ...................... 264/46.4 |
| 4,865,379 A | 9/1989 | Aoki et al. |
| 4,869,550 A * | 9/1989 | Lorenzen et al. ...... 297/180.12 |
| 4,952,776 A | 8/1990 | Huguet |
| 4,964,674 A | 10/1990 | Altmann et al. |
| 5,002,335 A | 3/1991 | Bengtsson |
| 5,523,664 A * | 6/1996 | Ogasawara ............... 297/284.4 |
| 5,723,845 A * | 3/1998 | Partington et al. .......... 219/217 |
| 5,928,548 A | 7/1999 | Johansson |
| 6,147,332 A * | 11/2000 | Holmberg et al. .......... 219/217 |
| 6,158,815 A * | 12/2000 | Sugie et al. ........... 297/452.49 |
| 6,179,378 B1 * | 1/2001 | Baumgartner et al. ...... 280/735 |

* cited by examiner

Primary Examiner—Teresa Walberg
Assistant Examiner—Vinod D. Patel
(74) Attorney, Agent, or Firm—Reising, Ethington, Barnes, Kisselle, Learman & McCulloch, P.C.

(57) ABSTRACT

A heating element that can be incorporated into a molded foam article closely adjacent to the outer cover sheet without showing any evidence that a heating element is encapsulated within the foam portion of the article and provides essentially the same relatively softness and "feel" that would be obtained if the heating element was not part of the article.

14 Claims, 5 Drawing Sheets

ELECTRIC HEATER FOR A SEAT ASSEMBLY

TECHNICAL FIELD

This invention relates to vehicle seats and more particularly concerns an electric heating element for a vehicle seat in which the trim cover is integrally affixed to a foam cushion member.

BACKGROUND OF THE INVENTION

It is well known to have a built-in heating element for providing heat to the body of the occupant of the driver seat and/or the passenger seat of a motor vehicle. The heat is provided by electric current supplied through a conductor having suitable resistivity that ensures the desired amount of heat from the conductor. The conductor, in the form of a resistance wire, is located on a layer of textile or a plastic material to provide a carrier in the form of a planar or flat sheet. The resistance wire is fixed in position on the carrier by stitching means or by an adhesive and, afterwards, positioned between various layers of material to form the heating element which then can be incorporated into a seat. In this regard, the heating element can be sandwiched between a top cover member of leather, fabric or plastic material and the foam rubber core portion or padding of the seat.

Seats provided for vehicles used for material handling, earthmoving, or lawn cutting are normally fabricated utilizing an in-mold forming process to reduce the cost of the seat. This type of process provides a seat having a core made of a plastic foam, such as polyurethane foam, that is bonded to an outer decorative cover sheet or skin during the molding process. In the practice of such process, a properly shaped mold cavity is lined with a thin plastic or fabric skin after which liquid polyurethane is poured onto the skin to form an integral seat cushion or seat back. Various attempts have been made to provide a relatively inexpensive seat of this type that would have a heating element incorporated between the skin of the article and the foam layer. In most cases, such attempts have resulted in the configuration of the heating element and/or the conductor being outlined in the cover sheet and, therefore, not acceptable from an aesthetic standpoint. Obviously, if the heating element. could be spaced from the skin a certain distance, maintained in such position, and completely encapsulated in the foam during the molding operation, the "reading" of or outline of the heating element would not be visible to the observer.

There has also been the problem in providing a comfortable "feel" to the buttocks of a seat occupant when seated in a seat assembly having a heating element as a part of the seat structure. Inasmuch as the heating element needs to be positioned relatively close to the outer skin of a seat member and becomes an integral part of the foam structure, it stands to reason that the heating element should be designed and constructed so that it does not take away from the softness and comfort of the seat. In other words, not only should the heating element within the seat not be detectable from an appearance standpoint but, in addition, the heating element should not cause the seat to provide any substantially less comfort when occupied than would be attainable if the heating element was not a part of the seat.

SUMMARY OF THE INVENTION

Accordingly, one object of the present invention is to provide a new and improved heating element that can be incorporated into a molded foam article closely adjacent to the outer cover sheet without showing any evidence that a heating element is encapsulated within the foam portion of the article and provides essentially the same relatively softness and "feel" that would be obtained if the heating element was not part of the article.

Another object of the present invention is to provide a new and improved heating element which can be positioned relatively close to the outer skin of a seat member and permit the occupant of the seat member to have a comfortable and relatively soft seating area without detecting any hardness or the "feel" of the heating element through his/her buttocks when sitting in the seat member.

A further object of the present invention is to provide a new and improved heating element for a seat member formed as a molded foam article that includes a porous carrier member having resistance wires attached to one side thereof and that serves as a spacer for preventing the heating element and/or the resistance wires from being outlined or in the outer skin of the seat member.

A still further object of the present invention is to provide a new and improved heating element for a seat member formed as a molded foam article that is held to the skin of the seat member in a fixed position during the molding operation so as to insure that the heating element is completely embedded within the foam and is substantially uniformly spaced from the outer skin of the seat member.

A still further object of the present invention is to provide a new and improved method of incorporating a heating element within a molded foam seat member so that it is not evident that a heating element is encapsulated within the article and the heating element is maintained uniformly closely adjacent to the outer skin of the article so as to effectively transfer heat to the occupant of the seat member and provide a relatively soft "feel" to the buttocks of the occupant.

The above and other objects of the present invention are realized in accordance with the present invention by providing a heating element for an in-place foam molded seat assembly having a seat cushion member and a seat back member each of which has the foam core thereof integrally formed with the outer cover sheet. More specifically and in the preferred form, the heating element comprises a generally rectangular carrier member having an open-cell reticulated plastic structure provided with a pair of spaced substantially parallel planar surfaces. An electric conductor in the form of a resistance wire is secured to one of the surfaces of the carrier member in a zig-zag pattern and in a plurality of spaced rows so as to cover substantially the entire area of the carrier member. In addition, in the preferred form, a double-faced adhesive tape incorporating a scrim as a reinforcement member is provided on the other of the pair of surfaces of the carrier member. The tape is adapted to connect the carrier member to the inner surface of the cover sheet so as to maintain the resistance wire spaced from and in a fixed position relative to the inner surface of the cover sheet during the molding of the seat member.

BRIEF DESCRIPTION OF THE DRAWINGS

Other objects and advantages of the present invention will be apparent from the following detailed description when taken with the drawings in which.

DETAILED DESCRIPTION OF THE INVENTION

Figure 1:
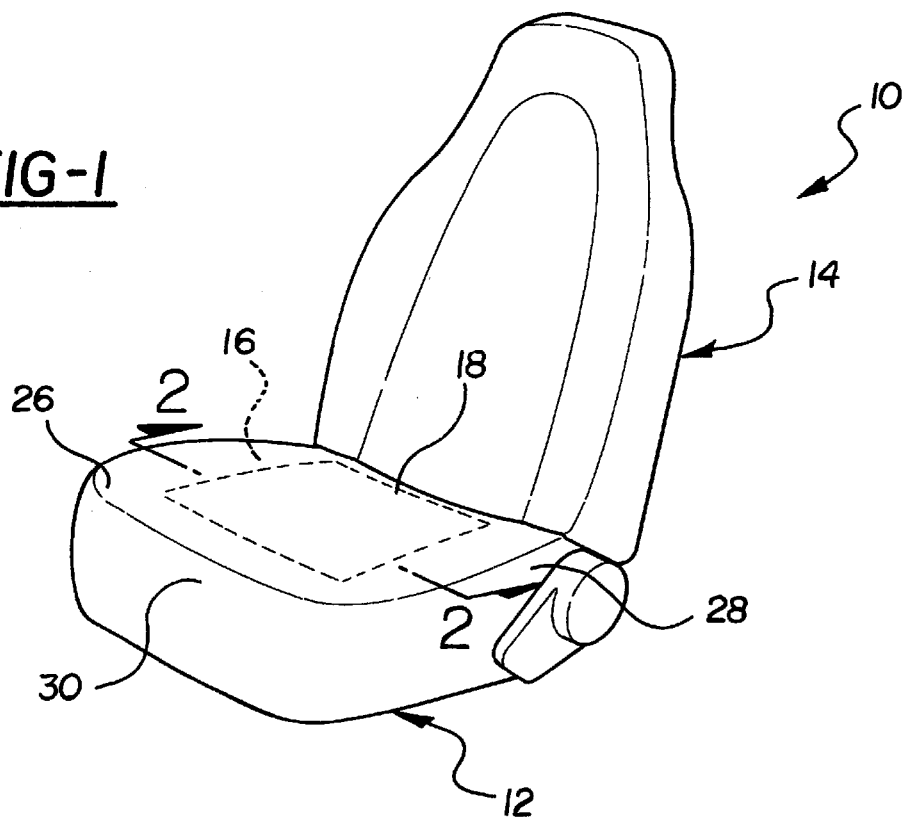
FIG. 1 is a perspective view of a molded foam seat assembly in which the seat cushion member incorporates a heating element made in accordance with the present invention.
Figure 2:
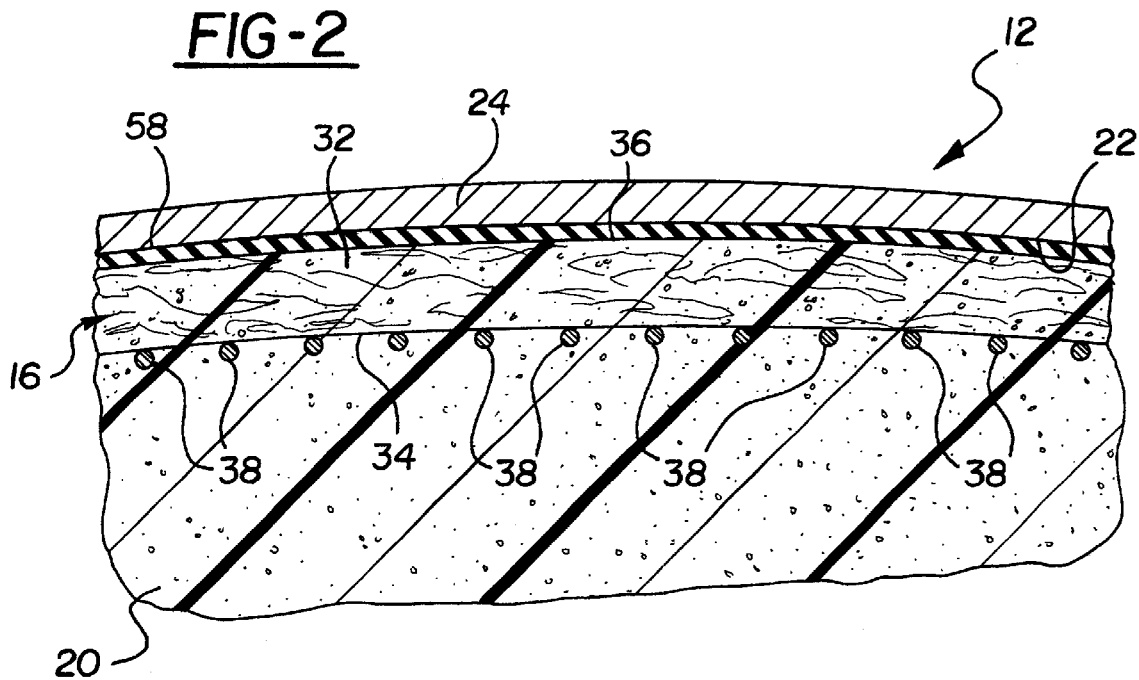
FIG. 2 is an enlarged cross sectional view taken on line 2—2 of FIG. 1 showing the heating element located with its resistance wires substantially uniformly spaced from the cover sheet of the seat cushion member and completed embedded within the foam material thereof.

Referring to the drawings and more particularly to FIGS. 1 and 2 thereof, a vehicle seat assembly 10 is shown comprising a seat cushion member 12 and a seat back member 14. The seat cushion member 12 includes a heating element 16, made in accordance with the invention, that is located in the buttocks support portion 18 of the seat cushion member 12 and serves to heat the buttocks of an occupant sitting in the seat assembly 10. As best seen in FIG. 2, the core portion 20 of the seat cushion member 12 is made of a foam material, such as polyurethane foam, which in this case, is shown securely bonded through the heating element 16 to the inner surface 22 of an outer cover sheet 24. The outer cover sheet 24 takes the form of a thin plastisol skin, such as vinyl plastisol, vinyl drysol, butadiene styrene or other known foam impermeable material. If desired, the cover sheet 24 can be a fabric material having a plastic backing so as to render it impermeable to the foam material which will ultimately constitute the core portion 20 of the seat cushion 12. As will be more fully described hereinafter, the seat cushion 12 is made in its entirety in a mold cavity which is configured so as to form the seat cushion 12 shown with a pair of laterally spaced raised side sections 26 and 28 and a raised front section 30, all of which define the recessed buttocks support portion 18.

Figure 3:
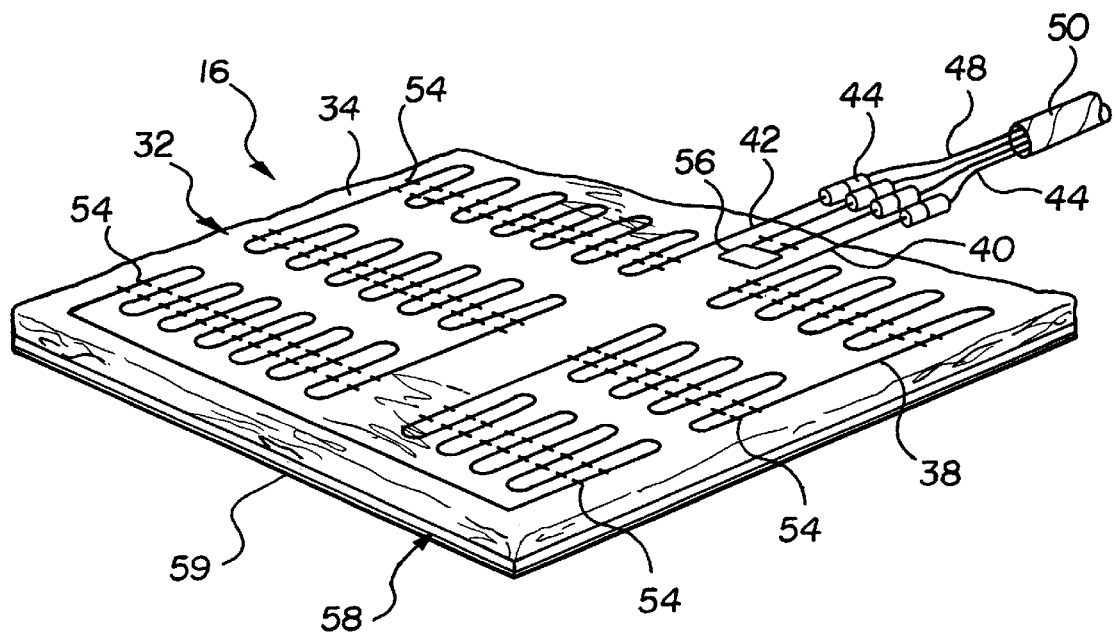
FIG. 3 is a perspective view of the heating element prior to being incorporated into the cavity of a mold for forming the seat cushion member seen in FIG. 1.
Figure 4:
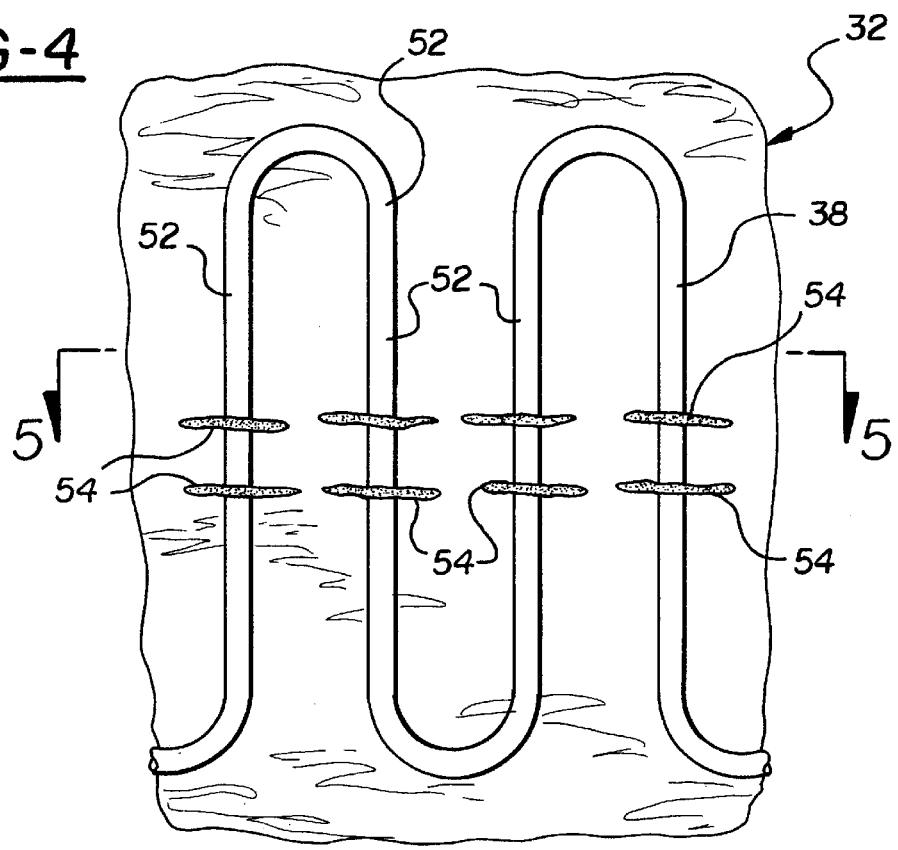
FIG. 4 is an enlarged plan view of a portion of the heating element seen in FIG. 3 showing the manner that the resistance wire is secured to the upper surface of the carrier member of the heating element.
Figure 5:
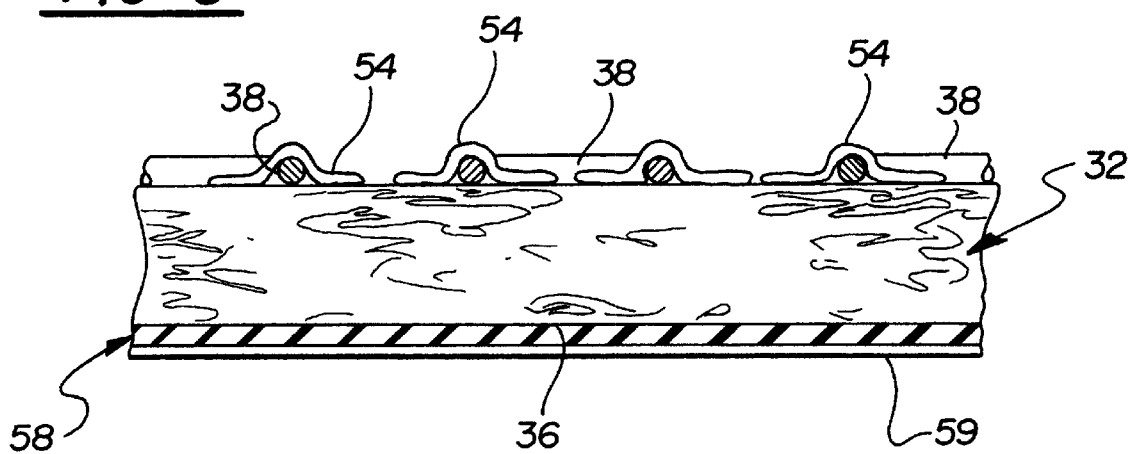
FIG. 5 is a sectional view taken on line 5—5 of FIG. 4.

As seen in FIG. 2, the heating element 16 is embedded in its entirety within the foam core portion 20 of the seat cushion member 12 in the area of the buttocks support portion 18. More specifically and as seen in FIGS. 3 and 4, the heating element 16 comprises a generally rectangular carrier member 32 in the form of a net-like reticulated foam having a network of open cells throughout its entire flexible body. The carrier member 32, as seen in FIG. 3 and 5, has a pair of spaced parallel surfaces, namely, an upper planar surface 34 and a lower planar surface 36. The upper surface 34, as seen in FIGS. 3 and 4, serves to fixedly support an electric resistance wire 38 which has a pair of ends 40 and 42, each of which is respectively connected by a connector 44 to conductors 46 and 48 located in an electric cable 50. The resistance wire 38 is arranged in a zig-zag pattern in three substantially parallel rows so as to cover most of the area of the upper surface 34 of the carrier member 32. As best seen in FIG. 4, the straight section 52 of each of the loops of the resistance wire 38 forming the zig-zag arrangement is connected by a hot-melt adhesive to one or more web portions of the carrier member 32.

As seen in FIG. 3, a thermostat 56 is provided on the upper surface 34 of the carrier member 32 at one side thereof midway of the adjacent row of the resistance wire 38 and serves to sense the temperature of the heating element 16. The thermostat 56 controls the time when the resistance wire 38 is energized so as to provide a substantially uniform heat to the occupant of the seat assembly 10. As in the case of the two ends 40 and 42 of the resistance wire 38, each end of the two conductors leading to the thermostat 56 are connected through a connector to one end of a pair of conductors located in the electrical cable 50. Also, as in the case of the resistance wire 38, the conductors leading to the thermostat 56 are secured to the webs of the carrier member 32 by a hot-melt adhesive 54. At this juncture, it should be noted that the electric cable 50 connects electrically through suitable switch and control means with the electrical power of the vehicle so as to provide electricity to both the resistance wire 38 an the thermostat 56 when it is desired by the occupant of the seat assembly 10.

Figure 9:
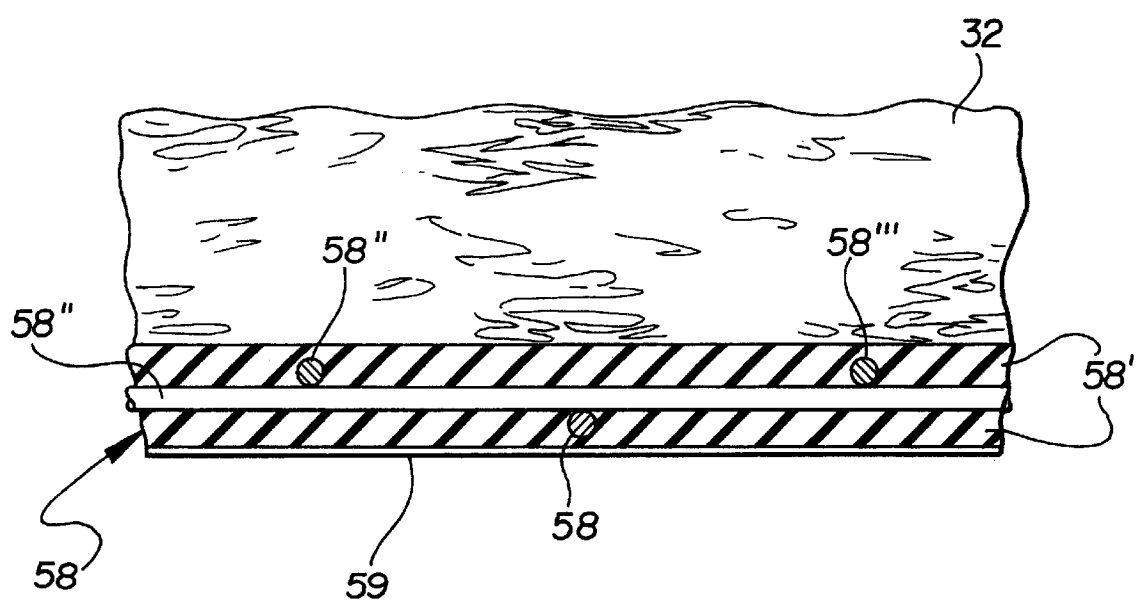
FIG. 9 is an enlargement of the portion circled and indicated by the letter "A" and shows in detail the construction of the double faced adhesive tape applied to the lower surface of the carrier member of the heating element.

As seen in FIG. 4, the webs along the entire lower surface 36 of the carrier member 32 are bonded to one face of a double-faced adhesive transfer tape 58. The tape 58 is of the same rectangular shape as that of the carrier member 32 and is coextensive with the lower surface 36 thereof. As best seen in FIG. 9, the tape 58 has a layer of pressure sensitive adhesive 58' coated on opposed sides of a scrim 58" made of a woven synthetic fiber. A specially treated paper liner 59 covers the entire lower face of the tape 58 and is removable therefrom without disturbing the adhesive adhering to the lower face of the tape 58. As will be more fully explained hereinafter, the liner 59 is removed to expose the lower face of the tape 58 prior to the heating element 16 being incorporated into the seat cushion 12. In addition and as will become more apparent as the description of the present invention proceeds, the tape 58 serves as a connector for maintaining the carrier member 32 in a fixed position during the molding process used in making the seat cushion member 12.

Figure 6:
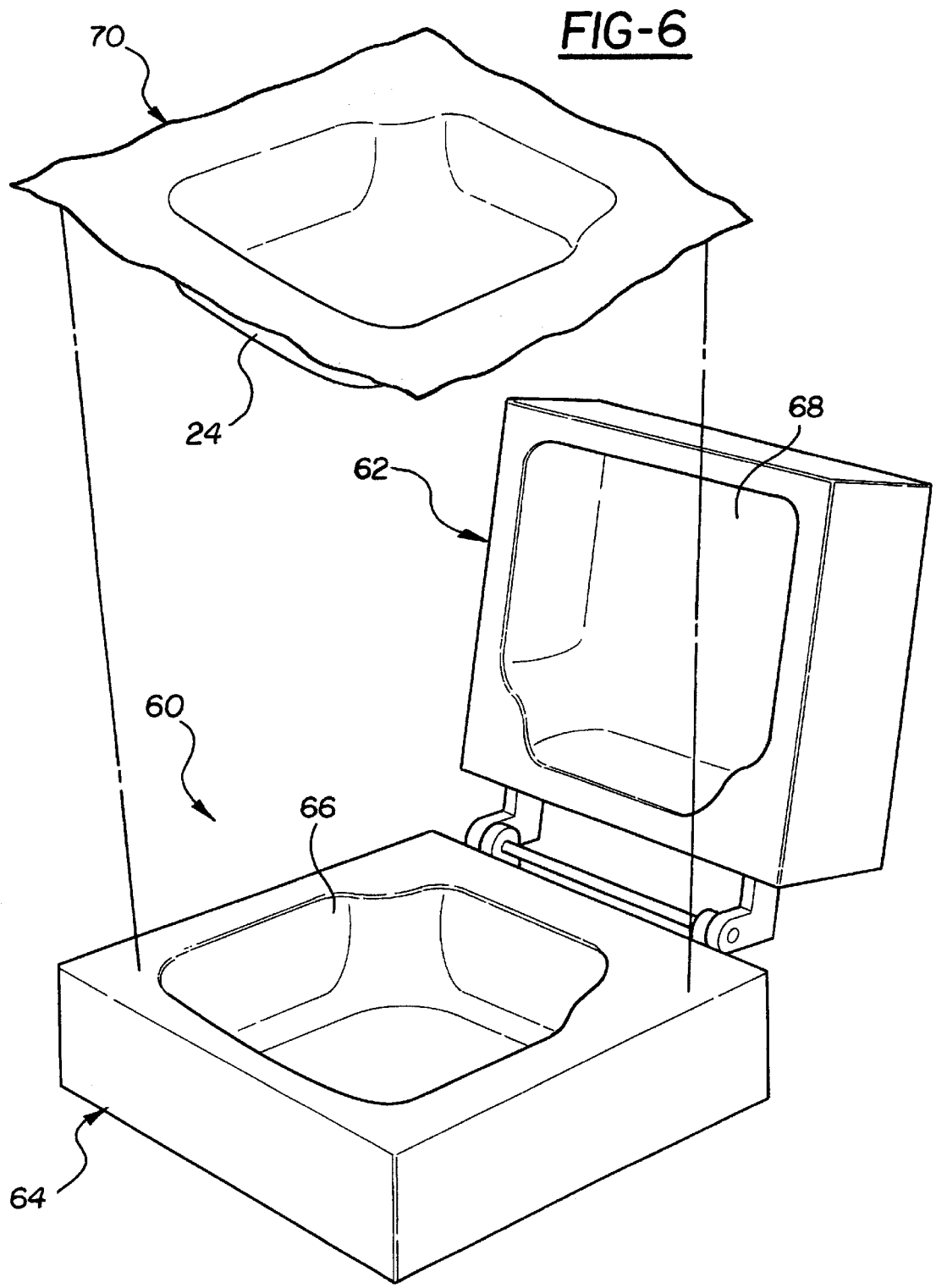
FIG. 6 is a perspective view of a mold having a lower mold portion and an upper mold portion used in forming the seat cushion of the seat assembly of FIG. 1 and shows the preformed cover sheet of the seat cushion member preparatory to its positioning within the cavity of the lower mold portion.

As mentioned above, the heating element 16 described above and as seen in FIG. 2 is embedded within the foam core portion 20 of the seat cushion member 12 closely adjacent to the inner surface 22 of the cover sheet 24. In practicing the process for obtaining this result, a two piece mold 60, as seen in FIG. 6, is provided comprising an upper mold portion 62 and a lower mold portion 64. The lower mold portion 64 is formed with a cavity 66 which conforms in shape to the upper part, as seen in FIG. 1, of the seat cushion member 12 while the upper mold portion 62 is provided with a cavity 68 which conforms to the bottom part of the seat cushion member 12. The upper mold portion 62 is pivotally connected to the lower mold portion 64 and is adapted to pivot downwardly onto the lower mold portion 64 so that the cavities 66 and 68 of the upper and lower mold portions 62 and 64, respectively, register with each other.

Prior to closing the mold 60, a flat sheet 70 made of a vinyl material, such as described above, is initially pre-formed so as to have the configuration of the seat cushion member 12. In this manner, the cover sheet 24 of the seat cushion member 12 is provided as an integral part of the sheet 70. Pre-forming of materials of this type is well known to those skilled in the art of in-place molding of articles. Accordingly, a description of the pre-forming process for achieving the configuration of the cover sheet 24 in the sheet 70 shall not be described in detail herein.

Figure 7:
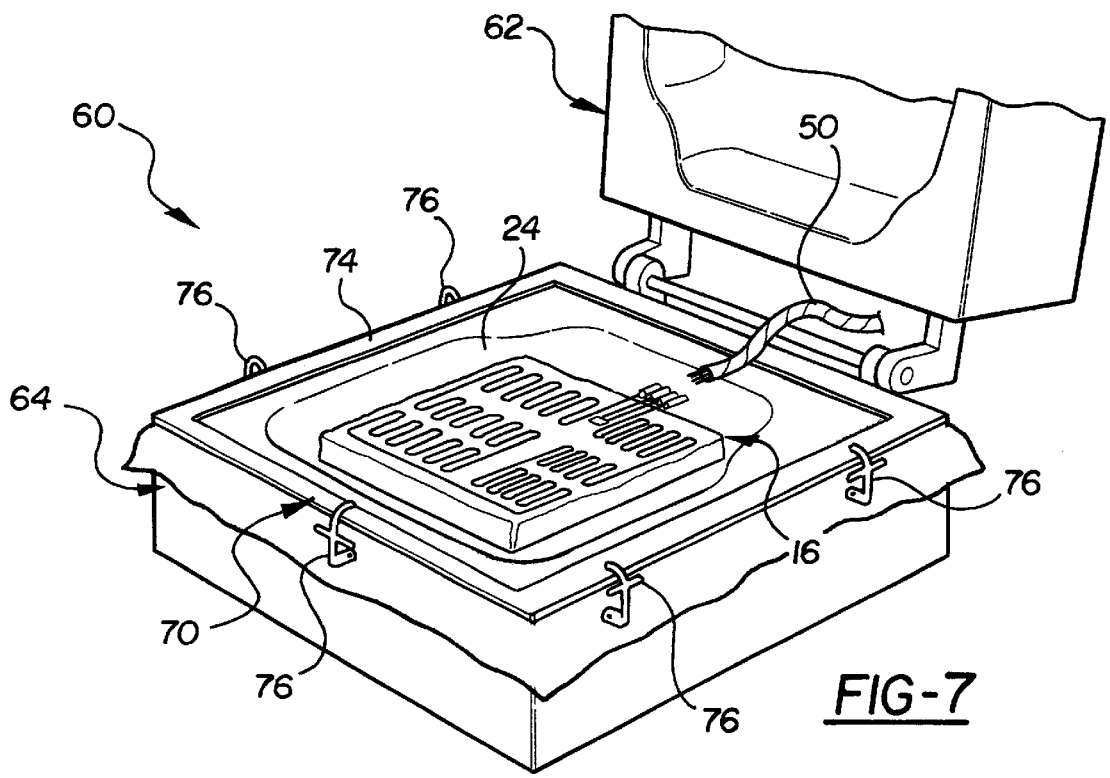
FIG. 7 shows the pre-formed cover sheet of the seat cushion located within the lower mold portion and also shows the heating element of FIG. 3 located in the buttocks area of the cover sheet within the cavity of the lower mold portion prior to the pouring of a liquid foam material into the mold.
Figure 8:
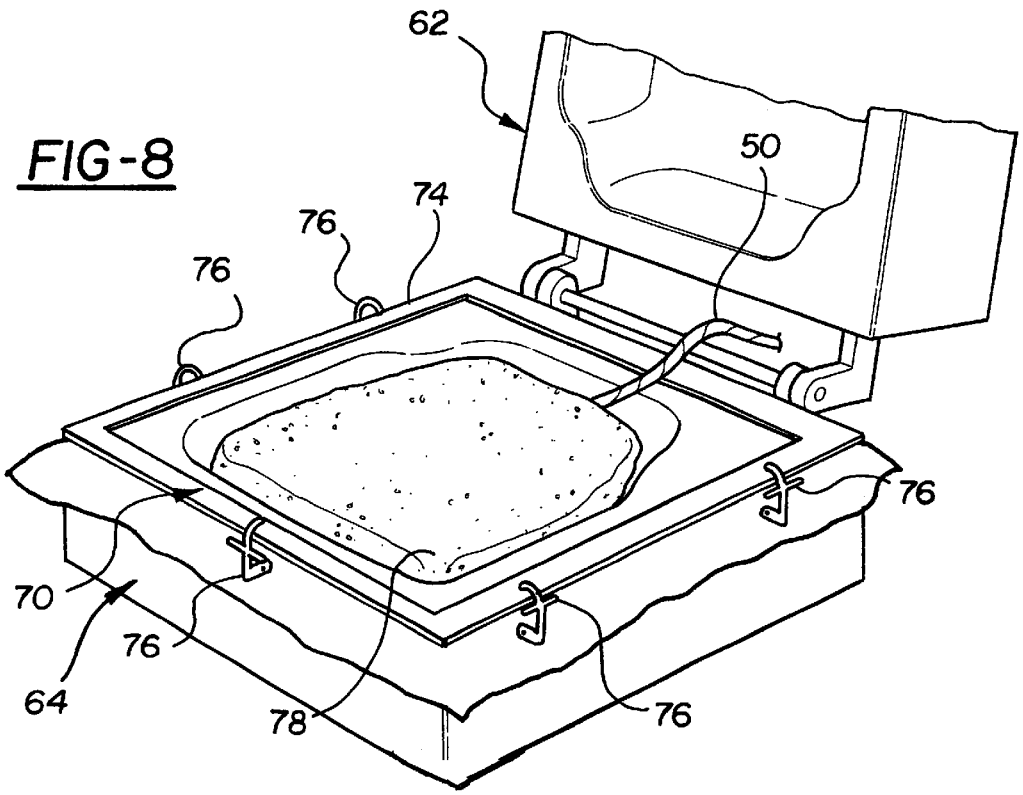
FIG. 8 shows the liquid foam material covering the heating element prior to the closing of the mold after which the mold is closed and the liquid foam material is molded to form the seat cushion of FIGS. 1 and 2.

Once the sheet 70 is pre-formed as seen in FIG. 6, the sheet 70 is positioned on the lower mold portion 64 with the cover sheet 24 located in the cavity 66, as seen in FIG. 7. The extremities of the sheet 70 surrounding the cover sheet 24 are held in place by a generally square open frame member 74 made of metal that is secured to the body of the lower mold portion 64 by a plurality of clamps 76. After the sheet 70 is properly located in the lower mold portion 64 and secured in place, the liner 59 is removed from the tape 58 by peeling the liner 59 off of the lower face of the tape 58. The heating element 16 is then placed in the area of the buttocks support portion 18 with exposed side of the adhesive 58' of the lower face of the tape 58 facing downwardly towards the inner surface 22 of the cover sheet 24. As a result, the exposed adhesive 58' on the lower face of the tape 58 contacts the inner surface 22 of the cover sheet 24 and adhesively secures the heating element 16 in a fixed position relative to the cover sheet 24. In order to have good adhesion between the tape 58 and the inner surface 22 of the cover sheet 24, the entire heating element 16 should be manually pressed downwardly to insure that the adhesive on the lower face of the tape 58 bonds firmly with the inner surface 22 of the cover sheet 24. At the same time, the cable 50 should be positioned as seen in FIG. 6 so that it extends out of the mold 60 when closed. Afterwards, the liquid urethane foam material 78 is poured into the mold to cover the heating element 16 as seen in FIGS. 7 and 8 so that the entire exposed portion of the heating element 16 is encapsulated within the liquid urethane foam. This is followed by having the upper mold portion 62 pivoted downwardly to close the mold 60 to cause the liquid foam material 78 to expand and cure and form the foam core portion 20 of the seat cushion member 12. The mold 60 is then opened, the cured article removed from the lower mold portion 64, and the extremities of the sheet 70 are trimmed so as to provide the seat cushion member 12 seen in FIGS. 1 and 2. Inasmuch as the carrier member 32 contains a multiplicity of open cells interconnected by thin web sections, the cured foam expands within the cells of the carrier member 32 and bonds to the inner face of the tape 58 in contact with the surface 36 of the carrier member 32. This results in the foam filled carrier member 32 effectively becoming a solid spacer member with the resistance wire 38 permanently substantially uniformly spaced from the inner surface 22 of the cover sheet 24. As a consequence, there is no "reading" or outline of the heating element 16 and/or the resistance wire 38 in the outer surface of the cover sheet 24 of the seat cushion member 12.

A seat cushion 12 of the type described above was made using a heating element 16 in which the carrier member 32 was a reticulated polyurethane sheet purchased from New Dimension Industries, One State Street, Moonachie, N.J. 07074-1402. The carrier member 32 was of uniform thickness measuring approximately one quarter inch (the distance between surfaces 34 and 36) and was identified by New Dimension Industries as "NSV4 Charcoal 0.25×14×18". The New Dimension Industries product specification sheet identifies the carrier member 32 as "Reticulated Polyurethane Ester Filter Foam S-04". The specification sheet identifies the properties and values of such sheet as follows:

| PROPERTY | VALUES |
| --- | --- |
| Cell Count | 04 pores per inch +1 |
| Density | 1.9 ± .1 lbs per cubic foot |
| 25% Compression force deflection (CFD) | 0.4 ± 1 lbs. per square inch |
| Tensile strength | 16 lbs per square inch minimum |
| Elongation | 170% minimum |
| Tear Strength | 4.5 lbs per square inch minimum |
| Compression set @ 50% Deflection | 15% loss maximum |
| 25% CLD autoclave loss | 10% maximum |
| Compression set @ 50% Deflection autoclave loss | 10% maximum |
| Tensile strength dry heat loss | 15% maximum |
| Volumetric air flow rate | 21 ± 2 cubic feet per minute |

The resistance wire 38 that can be used with the heating element 16 can be purchased from Springfield Wire Inc., 243 Cottage Street, Box 638, Springfield, Mass. 01102-0638. and should have a resistance of 226 plus-or-minus 5% Ohm/km with an operating temperature of −30 degrees Centigrade to plus 105 degrees Centigrade. The hot melt adhesive 54 used for holding the resistance wire 38 and the thermostat 56 in place on the carrier member 32 was purchased from Hot Melt Technologies, Inc., 1723 West Hamlin Road, P.O. Box 80067, Rochester, Mich. 48308 and was identified as Product Number 702. The adhesive 54 was applied with a spray gun so as to provide an open cell type bond with the webs of the carrier member 32. The double-faced transfer tape 58 was made by Compac Industries, Inc., Industrial Tape Division, 150 Fieldcrest Avenue, Edison, N.J. 08837. The tape 58 is a high tack acrylic adhesive tape coated on both sides of a synthetic fiber netting serving as a scrim reinforcement and is supplied with a moisture stable liner 59 of 50 lbs. basis weight. The tape 58 is identified by Compac Industries, Inc. "Net Bond 20". Another tape that can be used successfully for bonding the carrier member 32 to a seat cushion member cover sheet is made by the Industrial Tape and Specialties Division of Minnesota Mining and Manufacturing Company (3M) located at 3M Center Building 220-7E-01, St. Paul, Minn. 55144-1000. The 3M tape is identified as 950 Tape having an A-60 adhesive which is a medium firm acrylic pressure-sensitive adhesive system. The liner of the 3M tape is tan paper having an approximate thickness of 0.10 mm while the 3M tape only has a thickness of 0.13 mm. Another form of tape that can be used is a polyurethane film with an adhesive applied to opposed sides of the film. This form of tape was made experimentally by coating the opposed sides of the film with adhesives made by Adchem Corporation, 1852 Old Country Road, Riverhead, N.Y. 11901. The adhesive coating on one side of the film was identified as No. 5370 and the adhesive on the other side of the film was identified as No. 7332. The No. 5370 adhesive was applied to the side which is intended to adhere to the inner surface of the cavity in the mold. The thermostat 56 which forms a part of the heating element 16 was purchased from Portage Electric Products, Inc., 7700 Freedom Ave. N.W., North Canton, Ohio 44720. The thermostat 56 is identified by Portage Electric Products as Part No. C-102651, Model J and is a bi-metal snap action thermostat.

At this juncture, it will be noted that it has been found that when using a tape having a film or scrim as a reinforcement member, such film or scrim should be flexible in the sense that it is capable of being stretched sideways. This is important so that once the heating element 16 is embedded within the foam of the seat cushion member 12 and an occupant is seated in the seat assembly 10, the heating element 16 substantially conforms in shape to the configuration of the buttocks of the occupant. In other words, the tape 58 along with the attached carrier member 32 can stretch, move laterally and downwardly together with the foam material of the seat cushion member 12 when the weight of the occupant is applied by the buttocks of the occupant to the buttocks support portion 18 of the seat cushion member 12. This provides a softness to the buttocks support portion 18 permitting the buttocks of the seat occupant to have a comfortable seating effect without detecting any hardness in the support portion 18 of the seat cushion member 12.

Using a heating element 16 composed of the parts described above, the seat cushion member 12 was successfully made without any part of the heating element 16 being visible to an observer or outlined in the buttocks support portion 18 of the seat cushion member 12. Moreover, when an occupant sits in the seat assembly 10, there is no feel of the resistance wires 38 or of the heating element 16 through the person's buttocks. During one successful molding operation of the type described above, rather than using the sheet 70 made of a vinyl material for making the seat cushion member incorporating the heating element 16, a fabric material backed with a plastic coating that rendered the fabric impermeable to the foam was used. The fabric material was pre-formed to provide the configuration of the seat cushion member, placed in a mold such as mold 60, and afterwards the heating element 16 was positioned in the mold as described above. The liquid polyurethane foam material was poured in the area of the heating element 16 making certain that the entire exposed portion of the heating element 16 is covered with the liquid foam material, the mold was closed, and the foam material was allowed to cure to form the seat cushion member 12. The preformed fabric cover sheet used was made by Bayer Company located at Routes 5 & 10, P.O. Box 186, South Deerfield, Mass. 01373. Such cover sheet was identified by Bayer Company as part PT 9611-Deerfield Urethane. The foam material used to make the core of the seat cushion was a polyurethane foam having a density of 2.8 to 3 pounds per cubic foot.

In the above description of the present invention, the heating element 16 is shown as being incorporated only in the seat cushion member 12 of the seat assembly 10. It should be apparent that the heating element 16 can equally as well be incorporated into the seat back member 14 and have the seat back member 14 formed utilizing a process such as described in connection with the seat cushion member 12. Also, the heating element 16 is shown and described as having the double-faced adhesive tape 58 bonded to the carrier member 32. By so doing, the heating element 16 is a complete assembly ready for instant positioning onto the inner surface 22 of the cover sheet. 24. It should be apparent, however, that if desired, the double-faced adhesive tape 58 could be a separate part of the carrier member 32 rather than have it initially bonded, as seen in FIG. 5, to the lower surface 36 of the carrier member 32. Under such circumstances, the tape 58, by itself, could be applied directly to the inner surface 22 in the buttocks support section 18 of the cover sheet 24. After the tape is applied in this manner, the liner 59 would be removed and the carrier 32, together with the secured wire 38 and thermostat 56 would then be positioned onto the tape 58 so as to cause the lower surface 36 of the carrier member 32 to be bonded to the exposed adhesive face of the tape 58.

Various changes and modifications can be made in the construction of the heating element and the method described above without departing from the spirit of the invention. For example, rather than utilizing an adhesive such as the hot melt adhesive for fixing the wire 38 to the carrier member 32, other forms of adhesive have been found to work well for fixing the wire 38 to the carrier member 32, namely, Loctite Product 2651 and 3M Product 6111HT. Both of these adhesives can also be applied using a spray gun. The important consideration is to have the adhesive dry relatively quickly and serve to join the wire 38 to the web portions of the carrier member 32 in an open cell type bond which does not restrict the flow of the liquid foam into the interior of the carrier member 16 during the molding of the seat cushion member 12. Also, the tape 58 does not necessarily need to be coextensive with the carrier member 32. Instead, wide strips of the tape 58 together with the liner 59 can be applied to the surface 34 of the carrier member 32 along the rows containing the zig-zag wire 38. Also, rather than using resistance wires, one could substitute electrically conductive pure carbon elements which could be secured to the upper surface 34 of the carrier member 32. Such changes and modifications are contemplated by the inventors and they do not wish to be limited except by the scope of the appended claims.

What is claimed is:

1. An electric heater for an in-place form molded seat assembly comprising a seat cushion member and a seat back member each of which has a core portion made of a plastic foam material bonded to an outer cover sheet, the heater to be encapsulated into one of the members and having a carrier member composed of a reticulated open cell flexible structure to be filled with the foam material during a molding process of one of said members, said carrier member having a pair of spaced surfaces, an electric conductor secured to one of said surfaces, and a connector for joining the other side of the surfaces of the carrier member to an inner surface of the cover sheet to hold the carrier member on the inner surface of the cover sheet to maintain the electric conductor spaced from and in a fixed position relative to the inner surface during the molding operation of one of the members.

2. The electric heater of claim 1 wherein said electric conductor is a wire provided with a pair of ends to be electrically connected to the electrical system of a vehicle.

3. The electric heater of claim 1 wherein said electric conductor is a resistance wire arranged in a zig-zag pattern to cover substantially the entire area of one of said surfaces.

4. The electric heater of claim 3 wherein said wire is secured to the webs of said carrier member by an adhesive.

5. The electric heater of claim 4 wherein said zig-zag pattern is provided in a plurality of substantially parallel rows.

6. The electric heater of claim 5 wherein said upper surface supports a thermostat for sensing the temperature of said electric heater.

7. The electric heater of claim 6 wherein said electric conductor is a wire provided with a pair of ends and said pair of ends of said conductor and said thermostat are electrically connected through a cable to the electrical system of a vehicle.

8. The electric heater of claim 1 wherein said electric conductor is secured to one of said surfaces of said carrier member by plastic welds.

9. The electric heater of claim 1 wherein said connector is a double-faced adhesive tape.

10. The electric heater of claim 1 wherein said connector is a double-faced adhesive tape having a scrim as a reinforcement member.

11. An electric heater for an in-place foam molded seat cushion member having an integrally formed outer cover, said heater comprising a carrier member having a flexible open-cell reticulated plastic structure to be filled with liquid foam during the molding process, the carrier member being provided with spaced and upper and lower substantially planar surfaces, an electric conductor secured to the upper surface and covering substantially the entire area of the upper surface, and an adhesive located on the lower surface of said carrier member for bonding the carrier member to the inner surface of the outer cover to maintain the electric conductor spaced from and in a fixed position relative to the inner surface during the molding operation of the seat cushion member.

12. The electric heater of claim 11 wherein said adhesive includes a double-faced adhesive tape is provided with scrim as a reinforcing member, and a paper liner on one face of said tape to be removed prior to the heater being incorporated into said seat cushion member.

13. The electric heater of claim 11 wherein said electric conductor is secured to said upper surface of said carrier member by a plurality of plastic welds.

14. The heater of claim 11 wherein said zig-zag pattern is provided in a plurality of substantially parallel rows.

* * * * *

UNITED STATES PATENT AND TRADEMARK OFFICE
CERTIFICATE OF CORRECTION

PATENT NO. : 6,489,595 B1
DATED : December 3, 2002
INVENTOR(S) : Robert Check, William R. Parnis and Thomas A. Stuef It is certified that error appears in the above-identified patent and that said Letters Patent is hereby corrected as shown below:

<u>Title page,</u>
Item [57], ABSTRACT,
Line 1, after "A" delete "heating element" and insert therein --heater --
Line 3, after "a" delete "heating element" and insert therein --heater --
Line 6, after "the" delete "heating element" and insert therein -- heater --

<u>Column 1,</u>
Line 7, after "electric" delete "heating element" and insert therein -- heater --
Line 12, after "built-in" delete "heating element" and insert therein -- heater --
Line 23, before "which" delete "heating element" and insert therein -- heater --
Line 24, after "the" delete "heating element" and insert therein -- heater --
Line 39, after "a" delete "heating element" and insert therein --heater --
Line 42, before "and/or" delete "heating element" and insert therein -- heater --
Line 44, after "the" delete "heating element" and insert therein -- heater --
Line 49, before "would" delete "heating element" and insert therein -- heater --
Line 52, after "a" delete "heating element" and insert therein -- heater --
Line 53, after "the" delete "heating element" and insert therein -- heater --
Line 56, after "the" delete "heating element" and insert therein -- heater --
Line 59, before "within" delete "heating element" and insert therein -- heater --
Line 60, after "the" delete "heating element" and insert therein -- heater --
Line 63, before "was" delete "heating element" and insert therein -- heater --
Line 67, after "improved" delete "heating element" and insert therein -- heater --

<u>Column 2,</u>
Line 3, before "is" delete "heating element" and insert therein -- heater --
Lines 5-6, after "the" delete "heating element" and insert therein -- heater --
Lines 8 and 15, after "improved" delete "heating element" and insert therein --heater --
Line 12, after ""feel"" insert therein -- of any part --
Line 12, after "the" delete "heating element" and insert therein -- heater --
Lines 18-19, after "the" delete "heating element" and insert therein -- heater --
Line 22, after "improved" delete "heating element" and insert therein -- heater --
Line 25, after "the" delete "heating element" and insert therein -- heater --
Lines 29-30, after "a" delete "heating element" and insert therein -- heater --
Line 31, after "a" delete "heating element" and insert therein -- heater --

UNITED STATES PATENT AND TRADEMARK OFFICE
CERTIFICATE OF CORRECTION

PATENT NO.      : 6,489,595 B1
DATED           : December 3, 2002
INVENTOR(S)     : Robert Check, William R. Parnis and Thomas A. Stuef It is certified that error appears in the above-identified patent and that said Letters Patent is hereby corrected as shown below:

Column 2, cont'd.,
Line 32, after "the" delete "heating element" and insert therein -- heater --
Line 39, after "a" delete "heating element" and insert therein -- heater --
Line 43, after "the" delete "heating element" and insert therein -- heater --
Line 66, before "made" delete "heating element" and insert therein -- heater --

Column 3,
Line 2, after "the" delete "heating element" and insert therein -- heater --
Line 6, after "the" delete "heating element" and insert therein -- heater --
Lines 9-10, after "the" delete "heating element" and insert therein -- heater --
Line 12, after "the" delete "heating element" and insert therein -- heater --
Line 18, after "shows the" delete "preformed" and insert therein -- pre-formed --
Line 22, after "the" delete "heating element" and insert therein -- heater --
Line 27, before "prior" delete "heating element" and insert therein -- heater --
Line 33, after "the" delete "heating element" and insert therein -- heater --
Lines 41-42, after "a" delete "heating element" and insert therein -- heater --
Line 49, after "the" delete "heating element" and insert therein -- heater --
Line 63, after "the" delete "heating element" and insert therein -- heater --
Line 67, after "the" delete "heating element" and insert therein -- heater --

Column 4,
Line 20, after "the" delete "heating element" and insert therein -- heater --
Line 48, after "the" delete "heating element" and insert therein -- heater --
Line 55, after "the" delete "heating element" and insert therein -- heater --

Column 5,
Line 24, before "16" delete "heating element" and insert therein -- heater --
Line 30, after "the" delete "heating element" and insert therein -- heater --
Line 33, after "entire" delete "heating element" and insert therein -- heater --
Line 39, after "the" delete "heating element" and insert therein -- heater --
Line 41, after "the" delete "heating element" and insert therein -- heater --
Line 58, after "the" delete "heating element" and insert therein -- heater --
Line 62, after "a" delete "heating element" and insert therein -- heater --

UNITED STATES PATENT AND TRADEMARK OFFICE
CERTIFICATE OF CORRECTION

PATENT NO. : 6,489,595 B1
DATED : December 3, 2002
INVENTOR(S) : Robert Check, William R. Parnis and Thomas A. Stuef It is certified that error appears in the above-identified patent and that said Letters Patent is hereby corrected as shown below:

Column 6,
Lines 24-25, after "the" delete "heating element" and insert therein -- heater --

Column 7,
Line 5, after "the" delete "heating element" and insert therein -- heater --
Lines 7-8, after "the" delete "heating element" and insert therein -- heater --
Line 20, after "a" delete "heating element" and insert therein -- heater --
Line 22, after "the" delete "heating element" and insert therein -- heater --
Line 26, after "the" delete "heating element" and insert therein -- heater --
Line 30, after "the" delete "heating element" and insert therein -- heater --
Line 35, after "the" delete "heating element" and insert therein -- heater --
Line 37, after "the" delete "heating element" and insert therein -- heater --
Lines 38-39, after "the" delete "heating element" and insert therein -- heater --
Line 49, before "16" delete "heating element" and insert therein -- heater --
Line 51, after "the" delete "heating element" and insert therein -- heater --
Line 55, after "the" delete "heating element" and insert therein -- heater --
Lines 57-58, after "the" delete "heating element" and insert therein -- heater --

Column 8,
Line 6, after "the" delete "heating element" and insert therein -- heater --
Line 6, after "heater" insert therein -- 16 --
Line 18, after "carrier member" delete "16" and insert therein --32 --
Line 31, after "in-place" delete "form" and insert therein -- foam --

Signed and Sealed this

Twenty-first Day of October, 2003

JAMES E. ROGAN
*Director of the United States Patent and Trademark Office*